United States Patent [19]

Kimura

[11] Patent Number: 4,550,384

[45] Date of Patent: Oct. 29, 1985

[54] TOUCH SYSTEM COORDINATES INPUT APPARATUS

[75] Inventor: Kiyoshi Kimura, Miyagi, Japan

[73] Assignee: Alps Electric Co., Ltd., Japan

[21] Appl. No.: 431,327

[22] Filed: Sep. 30, 1982

[30] Foreign Application Priority Data

Oct. 20, 1981 [JP] Japan .......................... 56-155790[U]

[51] Int. Cl.⁴ ............................................. G08C 21/00
[52] U.S. Cl. ...................................... 364/556; 178/18
[58] Field of Search .................. 364/556, 508; 178/18; 367/907

[56] References Cited

U.S. PATENT DOCUMENTS 3,657,475  4/1972  Peronneau et al. .................. 178/18
4,340,777  7/1982  DeCosta et al. ...................... 178/18
4,355,202  10/1982 DeCosta et al. ...................... 178/18
4,389,711  6/1983  Hotta et al. .......................... 364/556

FOREIGN PATENT DOCUMENTS 139238  6/1978  Japan .

Primary Examiner—David H. Malzahn
Attorney, Agent, or Firm—Guy W. Shoup; Gerald F. Dunne

[57] ABSTRACT

An economical touch system coordinates input apparatus having high mechanical strength is disclosed. The coordinates input apparatus comprises a panel to which a push force is to be applied, a plurality of straining portions where component forces of the push force applied to the panel develop, detectors for detecting the strain developing at the straining portions, respectively, and calculation means for calculating the push point on the panel by means of the outputs of the detectors, wherein the panel is integral with the straining portions.

2 Claims, 9 Drawing Figures

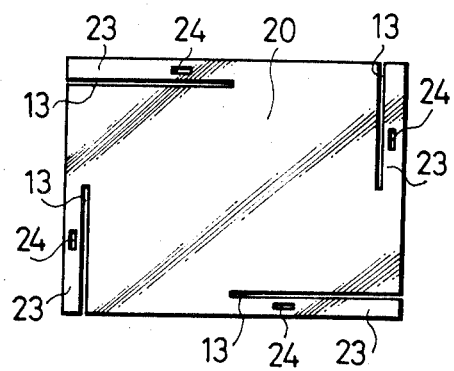
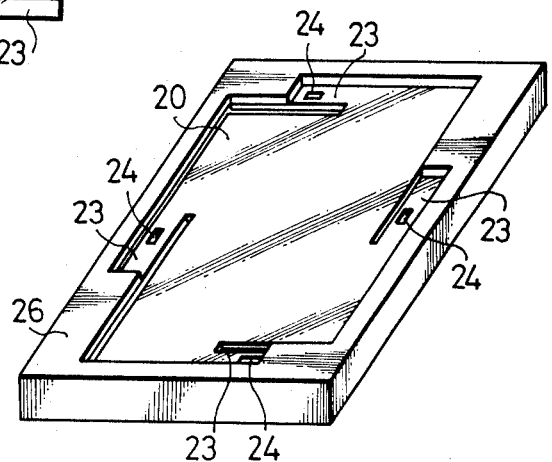
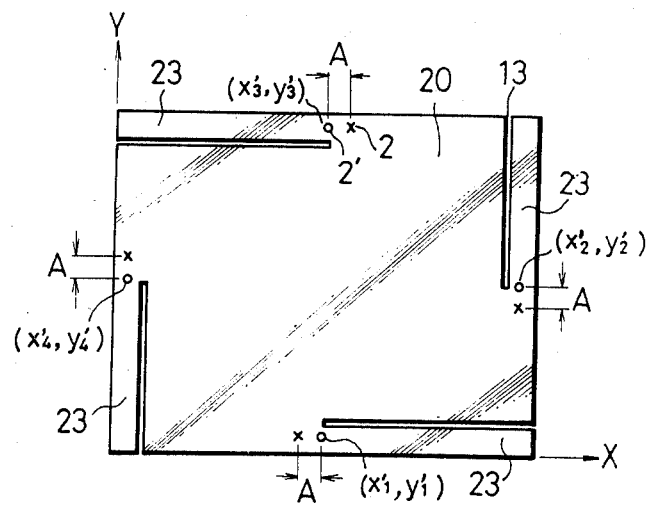

TOUCH SYSTEM COORDINATES INPUT APPARATUS

BACKGROUND OF THE INVENTION

This invention relates to a touch system coordinates input apparatus for calculating the coordinates of an arbitrary point on an input surface pushed by a finger, a pen or the like, by applying the component forces of the push force occurring at a plurality of support points of the panel to a computer or the like.

First, the principles of coordinate detection will be described.

A rigid plate 1 is supported at n points $(x_1, y_1)$, $(x_2, y_2)$, ..., $(x_n, y_n)$ as shown in FIG. 1. When an arbitrary point (x,y) of this rigid body is pushed with a force in the direction perpendicular to the drawing, component forces $f_1, f_2, \ldots, f_n$, are observed at the support points 2.

From the equilibrium of the forces in the perpendicular direction to the drawing, the following equation can be obtained:

$$F = f_1 + f_2 + \ldots + f_n \quad (1)$$

The following formula can be obtained from the equilibrium of the moments around the y axis:

$$x \cdot F = x_1 \cdot f_1 + x_2 \cdot f_2 + \ldots + x_n \cdot f_n \quad (2)$$

Similarly, the following formula can be obtained from the equilibrium of the moments around the x axis:

$$y \cdot F = y_1 \cdot f_1 + y_2 \cdot f_2 + \ldots + y_n \cdot f_n \quad (3)$$

From the formulas (1) through (3), the coordinates (x, y) of the push point can be determined as follows:

$$x = \frac{\Sigma x_i f_i}{\Sigma y_i}, \, y = \frac{\Sigma y_i f_i}{\Sigma y_i} \quad (4)$$

FIG. 2 shows an example of the prior art based on the principle described above.

The component forces $f_1-f_3$ can be determined by measuring the strain developing at a straining portion 3 by use of a strain guage 4. In this example, the input surface panel has a different structure from the structure of the straining portion 3 (cantilever or the like).

To clarify the point of application of the push force, the straining portion 3 is equipped with a frame 10 and needles 11 as illustrated in FIG. 3.

In accordance with the conventional structure, the point of application of the push force can be clarified but the support structure of the panel 1 becomes complicated, increasing the cost of production of the apparatus as a whole. Furthermore, since the panel 1 is supported by the needles 11, another problem develops in that the mechanical strength of the apparatus in low. Since the frame 10 projects from the panel 1, severe restrictions are imposed on the apparatus design and sometimes cause problems during the operation of the apparatus.

SUMMARY OF THE INVENTION

The present invention is therefore directed to provide a touch system coordinates input apparatus which eliminates the abovementioned problems with the prior art apparatuses, is economical and has high mechanical strength by integrating the panel with the straining portion.

BRIEF DESCRIPTION OF THE DRAWINGS

FIG. 4 is a plan view of the touch system coordinates input apparatus in accordance with an embodiment of the present invention;

FIG. 5 is a perspective view of the apparatus shown in FIG. 4 when it is mounted in the frame; and FIG. 6 schematically shows the principle of coordinate detection of the touch system coordinates input apparatus shown in FIG. 4.

DESCRIPTION OF THE PREFERRED EMBODIMENTS

Figure 1:
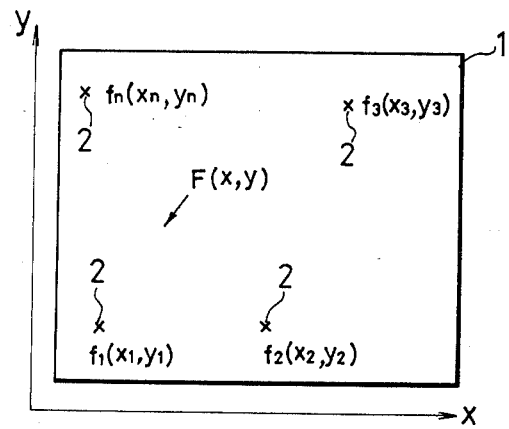
FIG. 1 schematically shows the principle of coordinate detection.
Figure 2A:
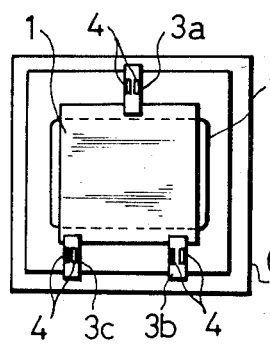
FIG. 2(a), 2(b) and 2(c) are plan views of conventional touch system coordinates input apparatuses.
Figure 2B:
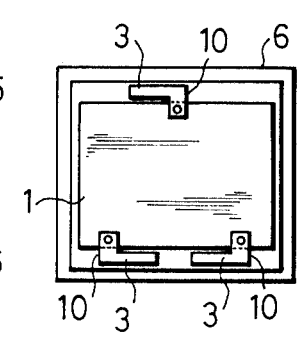
Figure 2C:
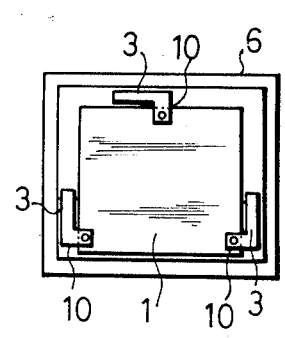
Figure 3A:
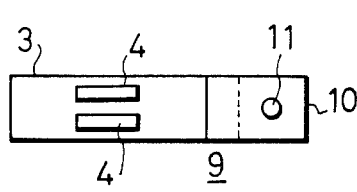
FIG. 3(a) is a plan view of the straining portion of the conventional apparatus.
Figure 3B:
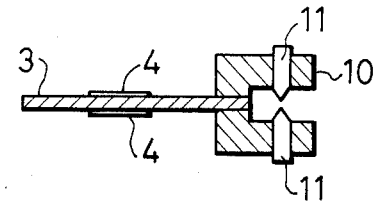
FIG. 3(b) is its longitudinal sectional view.

Hereinafter, preferred embodiments of the present invention will be described with reference to FIGS. 4 through 6.

FIG. 4 shows an example of the panel structure in which the input surface 20 of the panel and the straining portion 23 are integrated with each other. This panel structure can be easily produced by forming slots 13 at the four corners of a panel having a flat or curved surface.

The component forces of the push force are measured by the strain gauge 24 which is fitted to each straning portion 23.

FIG. 5 shows an example in which the panel structure shown in FIG. 4 is mounted to the frame 26. The tip of each straining portion 23 is fixed to the frame 26 by bonding, screws or the like.

Incidentally, the upper surface of the frame 26 may be aligned with the upper surface of the panel so that the frame 26 does not project upward beyond the panel.

The point of application of the push force in the apparatus having the abovementioned construction can be determined in the following manner.

The position of the true point application to be used for the calculation can be easily determined in the following way. The coordinates of the push point are assumed, and using the point of application perceived corresponding to the end position of slot 13 and these assumed coordinates, the true push point is obtained from the calculated coordinates and the difference between them.

An example of the principle of calculating the true point of application will be explained with reference to FIG. 6.

FIG. 6, the apparent point of application 2' is represented by O while the true point of application is represented by x. The deviation between them is represented by A. Since the structure of the slots 13 close to their end portions is the same, the deviation A can be assumed to be the same for all four positions. The true points of application can be expressed as $(x_1'-A, Y_1')$, $(x_2', y_2'-A)$, $(x_3'+A, y_3')$ and $(x_4', y_4'+A)$ using the coordinates represented in the drawing. Hence, the known coordinates of the push point (x, y) can be calculated in accordance with the following formulas, assuming that $F = f_1 + f_2 + f_3 + f_4$:

$$x = \frac{(x_1{}' - A)f_1{}' + x_2{}'f_2{}' + (x_3{}' + A)f_3 + x_4{}'f_4}{F} \quad (5)$$

$$y = \frac{y_1 f_1 + (y_2{}' - A)f_2 + y_3{}'f_3 + (y_4{}' + A)f_4}{F}$$

These formulas can be modified as follows:

$$x = \frac{x_1{}'f_1 + x_2{}'f_2 + x_3{}'f_3 + x_4{}'f_4}{F} + \frac{f_3 - f_1}{F}A \quad (6)$$

$$y = \frac{y_1{}'f_1 + y_2{}'f_2 + y_3{}'f_3 + y_4{}'f_4}{F} + \frac{f_4 - f_2}{F}A$$

The first item on the right side of both formulas represents the coordinates of the push point when calculated using the apparent point of application 2. Accordingly, the differences with respect to the known coordinates (x, y) are expressed as Ax and Ay, and are given by the following formulas:

$$A_x = \frac{f_3 - f_1}{F}A \quad (7)$$

$$A_y = \frac{f_4 - f_2}{F}A$$

The deviation A can be determined from either one of the above formulas. In other words, the true point of application to be used for determining the correct coordinates can be obtained.

This correction must be carried out experimentally but once this is done the coordinates detection becomes possible in exactly the same way as previously.

As described above, the present invention makes it possible to drastically of the production cost of the apparatus by simply forming slots at part of each of the four sides of the panel, for example, to form the straining portions 23 because the input surface 20 of the panel is integrated with the straining portions 23. Since there is no seam between the input surface 20 and the straining portion 23, various desired designs can be used.

Although the foregoing description deals with a case using four points of application, the present invention can be constructed in the same way even when there are three points of application. In the latter case, the cost of production of the apparatus can be further reduced. The slots 13 may be formed at other portions of the panel besides its four corners.

What is claimed is:

1. A touch panel for determining the coordinates for the point of application of pressure thereto, comprising a panel adapted to receive a pressing force applied thereto, means including a plurality of unitary straining portions formed integrally with said panel for developing component forces corresponding to said pressing force, means including respective detectors connected integrally to each said straining portion for developing signals suitable for processing to determine the point of application of said pressing force to said panel, wherein said straining portions are formed by strips of said panel formed by providing slots in marginal portions in said panel.

2. A touch panel according to claim 1, said panel being rectangular and said straining portion being formed at corner portions thereof.

* * * * *